United States Patent [19]
Muljono et al.

[11] Patent Number: 6,092,212
[45] Date of Patent: Jul. 18, 2000

[54] METHOD AND APPARATUS FOR DRIVING A STROBE SIGNAL

[75] Inventors: Harry Muljono, Union City; Stefan Rusu, Sunnyvale, both of Calif.

[73] Assignee: Intel Corporation, Santa Clara, Calif.

[21] Appl. No.: 08/996,305

[22] Filed: Dec. 22, 1997

[51] Int. Cl.[7] .................................................. G06F 1/04
[52] U.S. Cl. .......................... 713/600; 709/201; 712/25; 710/129
[58] Field of Search ................................. 713/400, 500, 713/600, 501, 502, 503, 601; 320/30; 307/480; 326/81; 365/207; 395/800.33; 712/25, 27, 26; 709/200, 201, 213, 231; 710/52, 61, 126, 129; 714/746, 747

[56] References Cited

U.S. PATENT DOCUMENTS

| | | | |
|---|---|---|---|
| 3,597,761 | 8/1971 | Fraschilla | 340/347 |
| 3,860,832 | 1/1975 | Aapro | 340/172.5 |
| 4,334,295 | 6/1982 | Nagami | 365/222 |
| 4,450,370 | 5/1984 | Davis | 307/475 |
| 4,675,695 | 6/1987 | Samuel | 346/1.1 |
| 4,849,939 | 7/1989 | Muranka et al. | 365/200 |
| 5,036,227 | 7/1991 | Jo et al. | 307/480 |
| 5,045,726 | 9/1991 | Leung | 307/466 |
| 5,521,449 | 5/1996 | Tao | 315/169.1 |
| 5,528,168 | 6/1996 | Kleveland | 326/30 |
| 5,659,689 | 8/1997 | Saraangdhar et al. | 710/126 |
| 5,680,591 | 10/1997 | Kansal et al. | 395/517 |
| 5,751,978 | 5/1998 | Tipple | 710/129 |
| 5,805,871 | 9/1998 | Baxter | 395/555 |

*Primary Examiner*—Joseph E. Palys
*Assistant Examiner*—Rijue Mai
*Attorney, Agent, or Firm*—Blakely, Sokoloff, Taylor & Zafman LLP

[57] ABSTRACT

A method and strobe circuit are provided for maintaining a strobe signal at a valid voltage level. The method includes driving the strobe signal at the valid voltage level using a first strobe driver, pre-driving the strobe signal at the valid voltage level using a second strobe driver while the first strobe driver is driving, and terminating the driving of the first strobe driver. The strobe circuit includes a strobe line, a first strobe driver having a first enable input for enabling the first strobe driver and adapted to drive the strobe line with a first strobe signal, and a second strobe driver having a second enable input for enabling the second strobe driver and adapted to drive the strobe line with a second strobe signal. A first strobe controller is coupled to the second enable input and adapted to enable the second strobe driver to pre-drive the second strobe signal while the first strobe driver is enabled, wherein the first and second strobe signals are at equal logic levels.

37 Claims, 6 Drawing Sheets

METHOD AND APPARATUS FOR DRIVING A STROBE SIGNAL

BACKGROUND OF THE INVENTION

1. Field of the Invention

This invention relates generally to transmission of signals, and, more particularly, to bi-directional strobe transmission with center-tapped termination.

2. Description of the Related Art

The demand for quicker and more powerful personal computers has led to many technological advances in the computer industry, including the development of more efficient and powerful processors. The future generation of high performance processors are projected to operate at much higher frequencies than today's processors. Processors operating at higher frequencies, however, can be susceptible to timing noise, such as inter symbol interference (ISI) noise, for example.

The ISI noise is undesirable because it is capable of disrupting the timing delays in a logic circuit, especially in logic circuits utilizing a source synchronous scheme. In a source synchronous scheme, strobe signals are transmitted along with the data.

A strobe is a signal used by a receiver to latch the data transmitted by a driver. Strobes can be implemented in logic circuits in a variety of ways. One implementation, for example, is to utilize two strobes (STB and STB#), where the receiver utilizes the two strobes to latch four packets of data that accompany the strobe signals. The strobes STB and STB# are inverses of each other. Typically, the first transition of STB (STB#) is low (high) to high (low), and each strobe transition (rising) is used by the receiver to identify and latch the correct packet of data. Thus, during the first transition of STB, the receiver will latch the first packet of the data, and during the first transition of STB#, the receiver will latch the next packet of the data, and so on. The transition completes when all four packets of the data have been latched by the receiver. After the data transfer is complete, the strobes are maintained at voltage levels substantially identical to initial voltage levels. Thus, the strobe STB is maintained low, while the strobe STB# is maintained high.

One well-known method for reducing the ISI noise during the transmission of signals is commonly referred to as center-tapped termination (CTT). To reduce the ISI noise, it is desirable to apply CTT to strobes as well. However, applying CTT to strobes in a bi-directional transmission scheme causes the strobes to drift to a metastable state when the strobes are not driven during a bus turnaround cycle. A bus turnaround cycle is the transition period during which a driver, which was initially driving the strobe signal, becomes a receiver, and the receiver, which was initially receiving data, becomes the driver. The driver initially driving the strobes is hereinafter referred to as the "current-driver," whereas the driver that subsequently drives the strobes is referred to as the "next-driver."

Because it is possible that neither the current-driver nor the next-driver is driving the strobes during the turnaround cycle, the strobes can drift to a metastable state because of CTT. Typically, it is the bus keepers that sustain the strobes at valid voltage levels during a bus turnaround cycle. However, because these bus keepers only supply small current-driving levels to sustain the strobes at valid voltage levels, the high current-driving levels of CTTs override the bus keepers, causing the strobes to drift to one-half of $V_{cc}$ (power supply). This metastable state causes the strobe state machine at the receiver to go to an incorrect state, thereby hampering the use of CTT on strobes. Thus, there is a need of a method and apparatus of implementing CTT on strobes in a bi-directional transmission scheme that would prevent the strobes from drifting to a metastable state.

The present invention is directed to overcoming, or at least reducing the effects of, one or more of the problems set forth above.

SUMMARY OF THE INVENTION

In one aspect of the present invention, a method is provided for maintaining a strobe signal at a valid voltage level. The method includes driving the strobe signal at the valid voltage level using a first strobe driver, pre-driving the strobe signal at the valid voltage level using a second strobe driver while the first strobe driver is driving, and terminating the driving of the first strobe driver.

In another aspect of the present invention, a strobe circuit is provided. The strobe circuit includes an external port, a first strobe driver having an enable input and being adapted to provide a first strobe signal to the external port, a first strobe receiver adapted to receive an external strobe signal from the external port, and a strobe controller adapted to detect a last transition in the external strobe signal.

Yet in another of the present invention, a strobe circuit is provided that includes an external port. A first strobe driver is adapted to provide a first strobe signal to the external port, the first strobe driver including an enable input, the enable input being adapted to receive an external termination signal and disable the first strobe driver in response to the external termination signal. A first strobe controller adapted to pre-drive the first strobe driver.

BRIEF DESCRIPTION OF THE DRAWINGS

Other objects and advantages of the invention will become apparent upon reading the following detailed description and upon reference to the drawings in which.

Figure 1:
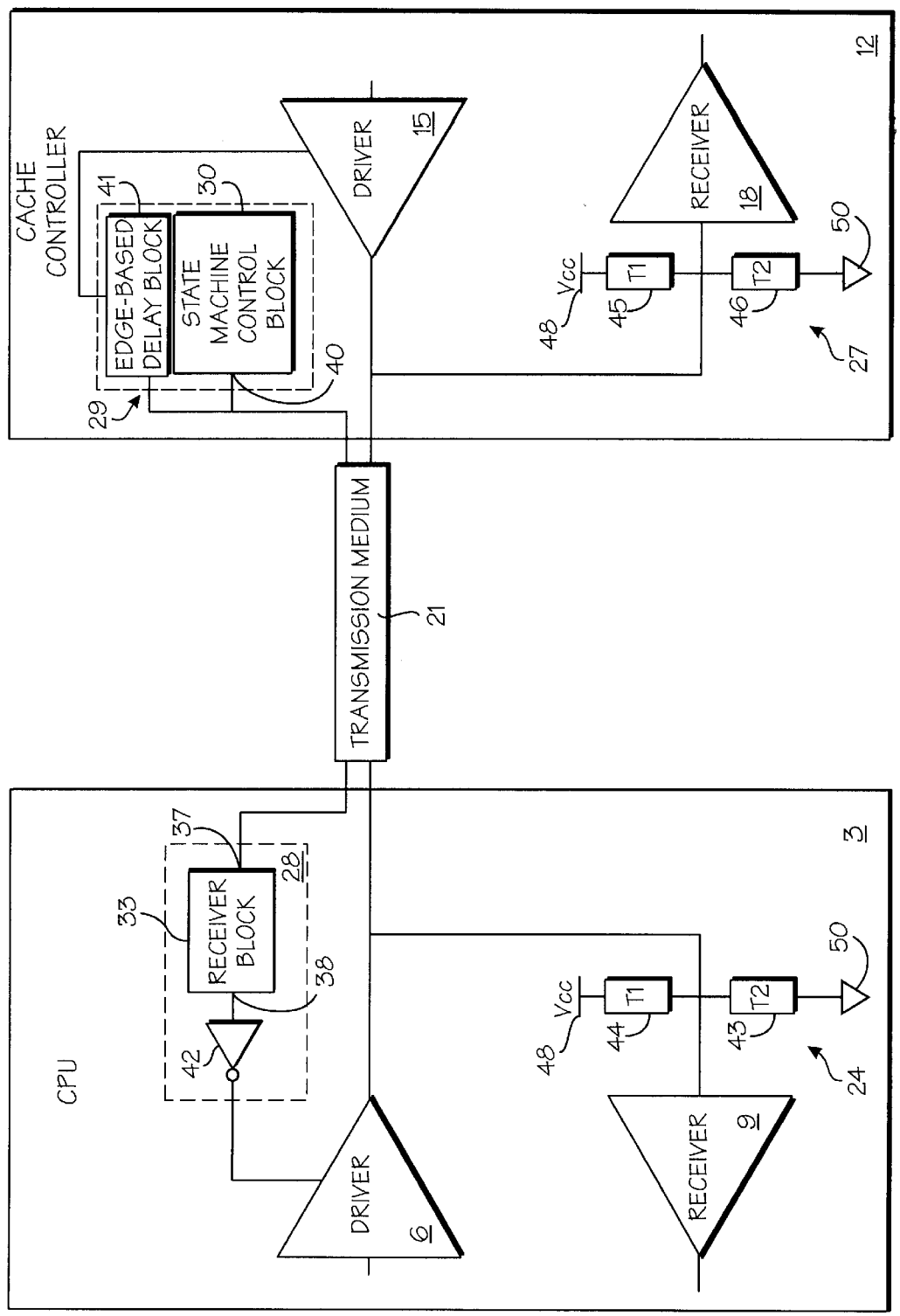
FIG. 1 is a block diagram of a first embodiment of the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

First Embodiment

Referring now to the drawings, and in particular to FIG. 1, there is shown a first embodiment of the present invention. As shown, FIG. 1 includes a central processing unit (CPU) 3 having a driver 6 and a receiver 9, a cache controller 12 having a driver 15 and a receiver 18, a transmission medium 21, a first and second CTT interface 24,27 coupled to the respective receivers 9,18 of the CPU 3 and cache controller 12, a first strobe controller 28, and a second strobe controller 29. The drivers 6,15 and receivers 9,18 drive and receive the STB strobe. Although only the drivers 6,15 and receivers 9,18 of the STB strobe are shown in FIG. 1, it should be noted that the STB# strobe would also have corresponding drivers and receivers. The transmission medium 21 allows the CPU 3 and the cache controller 12 to communicate with each other.

The CPU 3 is capable of transmitting and receiving signals to and from the cache controller 12. The first strobe controller 28 includes a receiver block 33 and an inverter 42. The receiver block 33 of the first strobe controller 28 has an input terminal 37 and an output terminal 38. The input terminal 37 of the receiver block 33 is coupled to an output terminal 40 of a state machine control block 30 of the second strobe controller 29 through the transmission medium 21, and the output terminal 38 of the receiver block 33 is coupled the inverter 42. An output of the inverter 42 is coupled to an enable input terminal of the CPU driver 6. An input terminal of the CPU receiver 9 is coupled to the first CTT interface 24, as well as to the cache controller 12 through the transmission medium 21. An output of the CPU driver 6 is coupled to the transmission medium 21, which carries the signal to the cache controller 12.

The cache controller 12 is capable of transmitting and receiving signals to and from the CPU 3. The second strobe controller 29 comprises the state machine control block 30 and an edge-based delay block 41. An input terminal of the edge-based delay block 41 of the second strobe controller 29 is coupled to the output of the state machine control block 30 of the second strobe controller 29, and an output terminal of the edge-based delay block 41 of the strobe controller 29 is coupled to a termination enable input terminal of the cache controller driver 15. An input terminal of the receiver 18 of the cache controller 12 is coupled to the second CTT interface 27, as well as to the CPU 3 through the transmission medium 21. An output terminal of the driver 15 of the cache controller 12 is coupled to the transmission medium 21, which carries the signal to the CPU 3.

The first and second CTT interfaces 24,27 are well known in the art and will not be discussed in detail here. Generally, the CTT interfaces 24,27 comprise a first and a second terminator 43–46, where the terminators 43–46 can be any device that is capable of being enable and disabled with a control signal. A first terminal of the first terminator 44,45 is coupled to $V_{cc}$ 48, a power supply, and a second terminal of the first terminator 44,45 is coupled to a first terminal of the second terminator 43,36, as well as to the input terminal of the receivers 9,18 of the CPU 3 and the cache controller 12. The second terminal of the second terminator 43,46 is coupled to ground 50. The terminators 43–46 are generally activated during the periods the CPU 3 and the cache controller 12 are in the receiving mode (i.e. receiving signals).

The second strobe controller 29 determines whether it is the CPU 3 or the cache controller 12 that drives the strobes. The strobes are driven by the CPU 3 or the cache controller 12 whenever a termination enable signal to the enable input of the respective drivers 6,15 is a logic high. Thus, a logic high termination enable signal transmitted by the second strobe controller 29 activates the cache controller driver 15, however, because the inverter 42 of the first strobe controller 28 inverts the termination enable signal before it reaches the termination enable input terminal of the CPU driver 6, a logic high termination enable signal deactivates the CPU driver 6. The edge-based delay block 41 of the second strobe controller 29 detects a high to low transition in the termination enable signal and delays it by a selected interval, which allows the cache controller driver 15 to post-drive (explained below in more detail) the strobes for the selected interval. The edge-based delay block 41 does not delay the termination enable signal when it detects a low to high transition in the termination enable signal. Those skilled in the art will appreciate that a variety of methods can be utilized to achieve the functionality of the edge-based delay block 41.

To ensure that the strobes remain at a known voltage level and do not drift to a metastable state during a turnaround cycle, the first embodiment of the present invention allows the CPU driver 6 and the cache controller driver 15 to drive the strobe signals at the same time during the turnaround cycle. To accomplish this, one of the drivers 6,15 is assigned to be the "default" driver (in this case the CPU driver, for example), where the default driver 6 continuously drives the strobes until it is requested to relinquish the control of the strobes. The default driver 6 relinquishes control when the second strobe controller 29 of the next-driver (i.e. the cache controller driver, for example) 15 transmits a termination enable signal to the default driver 6. Both the default driver 6 and the next driver 12 simultaneously drive the strobes during the flight time of the termination enable signal (i.e. until the termination enable signal reaches the default driver 6). When the default driver 6 detects the termination enable signal, it stops driving and turns on its CTT terminators 43,44. There is no contention between the next-driver 15 and the default driver 6 during the overlapping period because both drivers 6,15 are pulling the strobes in the same direction, that is, the STB is pulled low, while the STB# is pulled high.

Figure 2:
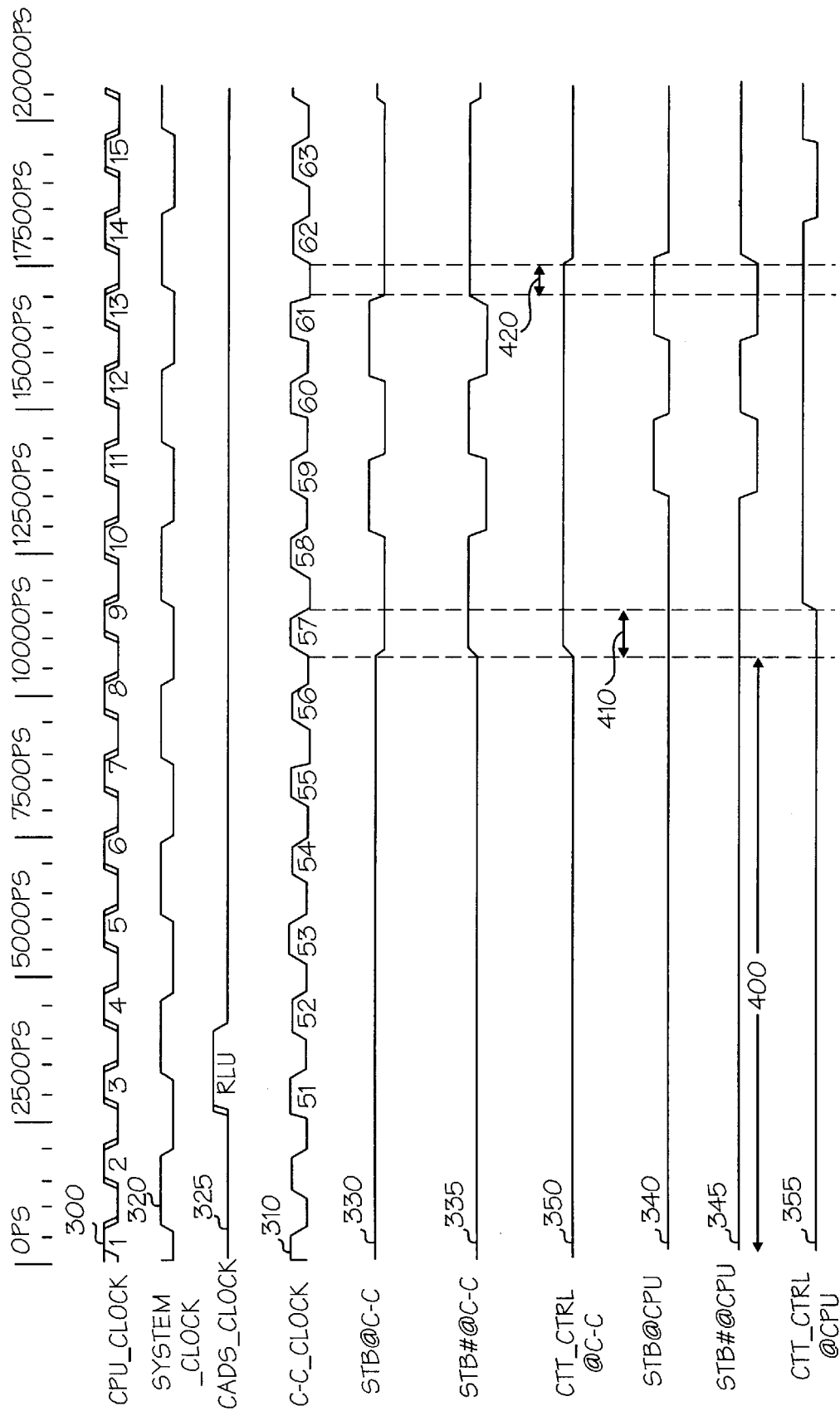
FIG. 2 is a timing diagram of the first embodiment of the present invention.

FIG. 2 illustrates a timing diagram of the first embodiment of FIG. 1. A CPU_clock 300 is the internal clock of the CPU 3, and a cache-controller_clock 310 is the internal clock of the cache controller 12. The cache-controller_clock 310 has a known timing relationship with respect to the CPU_clock 300 because the cache-controller_clock 310 is generated by a phase-lock loop (PLL) (not shown), which is controlled by the CPU_clock 300. Typically, the cache-controller_clock 310 lags the CPU_clock 300. For example, clock cycles 1, 2, 3, etc., of the CPU_clock 300 correspond to clock cycles 51, 52, 53, etc. of the cache-controller_clock 310. Other signals shown in FIG. 2 include: A system_clock 320, which is generated based on the CPU_clock 300, is later used to generate the cache-controller_clock 310. A CADS_clock 325 is a request signal submitted by the CPU 3 to the cache controller 12. A STB@cache-controller 330 is the STB signal at the cache controller 12, and a STB#@cache-controller 335 is the STB# signal at the cache controller 12. A STB@CPU 340 is the STB signal at the CPU 3, and the STB#@CPU 345 is a STB# signal at the CPU 3. A CTT_ctrl@cache-controller 350 and CTT_ctrl@CPU 355 are the termination enable signals at the cache-controller 12 and the CPU 3, respectively.

As the timing diagram of FIG. 2 illustrates, during an initial period 400, the CPU 3 drives the strobes. At clock cycle 57 of the cache-controller_clock 310, the cache-controller 12 wants to transmit data to the CPU 3. Thus, at clock cycle 57 of the cache-controller_clock 310, the cache controller 12 transmits the CTT_ctrl@cache-controller 350 (i.e. the termination enable control signal) to the CPU 3, as well as starts driving the STB and STB# strobes. Accordingly, the STB@cache-controller 330 is driven low, and the STB#@cache-controller 335 and CTT_ctrl@cache-controller 350 are driven high during a first transition edge of clock cycle 57 of the cache-controller_clock. The CTT_ctrl@cache-controller (i.e. the termination enable signal) 350 does not reach the CPU 3 instantly because of the propagation delay from the cache controller 12 to the CPU 3. Thus, for the duration that the termination enable signal 350 is in transit (interval 410), both the cache controller 12 and CPU 3 drive the strobes, thereby preventing the strobes from drifting to a metastable state. However, once the CPU 3 detects the CTT_ctrl@CPU (i.e. termination enable signal at the CPU 3) 355, it turns off its driver 6 and turns on its CTT terminators 43,44.

At clock cycle 62 of the cache-controller_clock 310, when the cache controller 12 has completed its transmission and wants to return the control to the CPU 3, the cache controller 12 transmits a logic low CTT_ctrl@cache-controller signal 350 (i.e. a low termination enable signal) to the CPU 3. To ensure that the strobes do not drift to a metastable state after the cache controller 12 completes its transmission, the cache controller 12 post-drives the strobe signals for a selected interval 420, thus allowing the CPU 3 enough time to detect the CTT_ctrl@CPU (i.e. termination enable signal at the CPU 3) 355 and, accordingly, turn off its CTT terminators 43,44. The edge-based delay block 41 of the second strobe controller 29 is utilized to allow the cache controller driver 15 to post-drive for the selected interval. After the post-drive interval, the CPU 3 alone drives the strobes once again.

Second Embodiment

Figure 3:
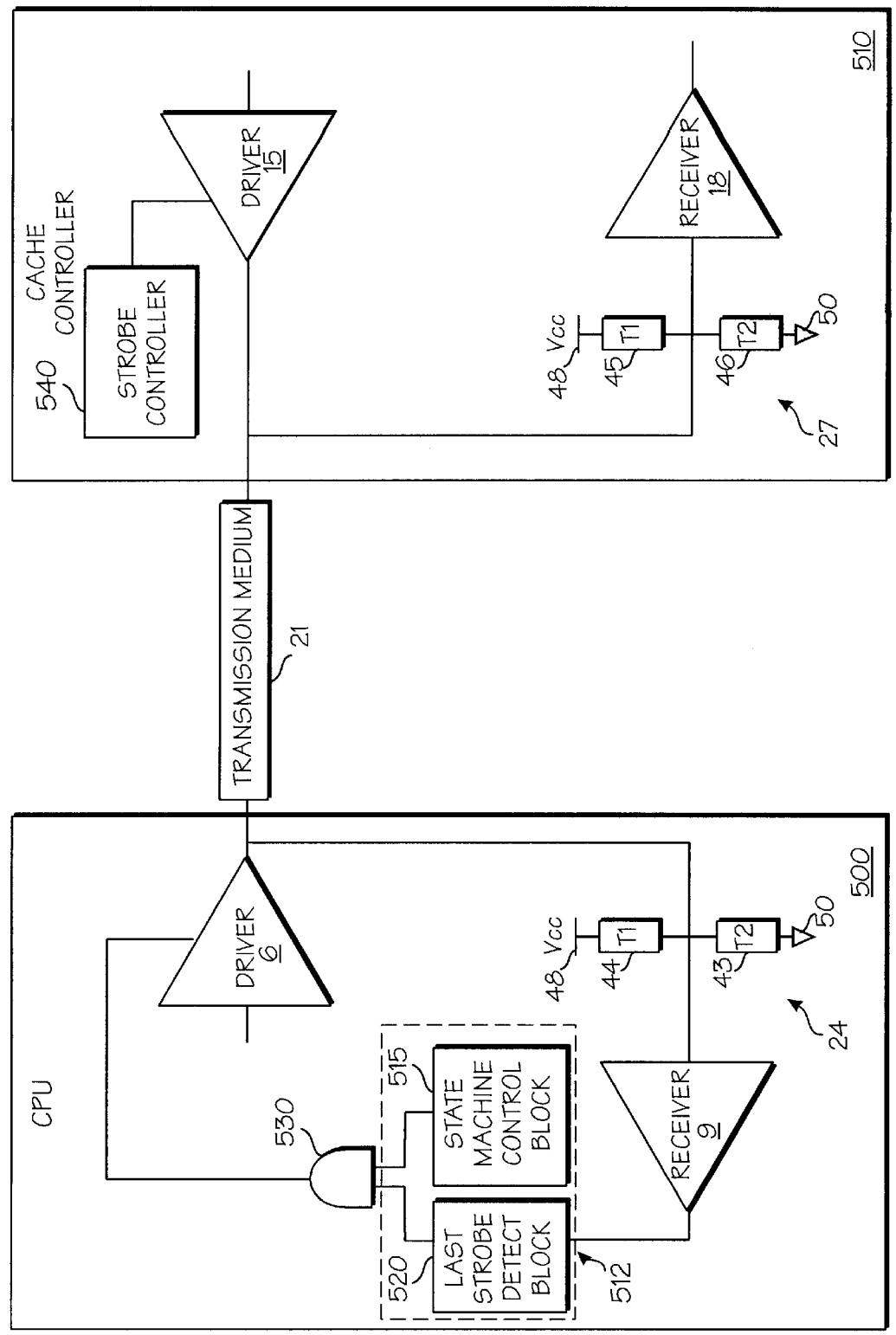
FIG. 3 is a block diagram of a second embodiment of the present invention.

FIG. 3 illustrates the second embodiment of the present invention, which includes a CPU 500 and a cache controller 510. The CPU 500 includes a strobe controller 512, a STB strobe driver 6, a STB strobe receiver 9, and a first CTT interface 24. The strobe controller 512, which generates a termination enable control signal, comprises a state machine control block 515, a last strobe detect block 520, and an AND gate 530. An output terminal of the state machine control block 515 and an output terminal of the last strobe detect block 520 are coupled to the input terminals of the AND gate 530. An output terminal of the AND gate 530 of the strobe controller 512 is coupled to an enable input terminal of the CPU driver 6. An input terminal of the last strobe detect block 520 is adapted to receive strobe STB from the receiver 9. An input terminal of the CPU strobe receiver 9 is coupled to the first CTT interface 24, as well as to the cache controller 510 through the transmission medium 21. An output of the CPU strobe driver 6 is coupled to the transmission medium 21, which carries the strobe signal to the cache controller 510.

The cache controller 510 includes a STB strobe driver 15, a STB strobe receiver 18, a strobe controller 540, and a second CTT interface 27. The strobe controller 540 enables or disables the cache controller driver 15. An input terminal of the receiver 18 of the cache controller 510 is coupled to the second CTT interface 27, as well as to the CPU 500 through the transmission medium 21. An output terminal of the driver 15 of the cache controller 510 is coupled to the transmission medium 21, which carries the strobe STB to the CPU 500.

It should be noted that, although not shown in FIG. 3, another set of corresponding drivers 6,15 and receivers 9,18 are utilized to drive and receive the STB# strobe. The strobe controller 512 would also control the STB# driver.

Figure 4:
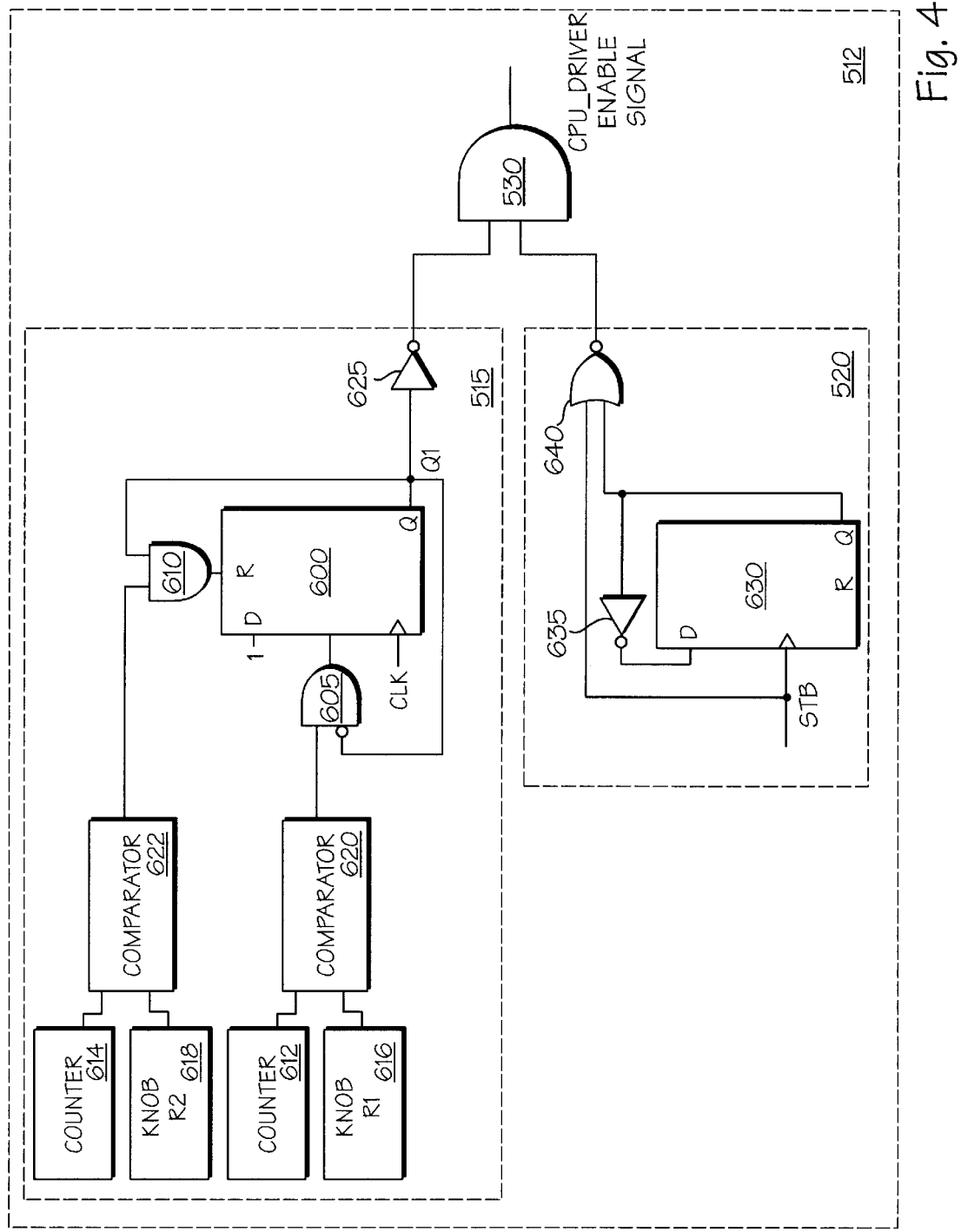
FIG. 4 is a schematic diagram of a state machine control block and last strobe detect block of the second embodiment of the present invention.

FIG. 4 depicts a schematic diagram of the strobe controller 512, which includes the state machine control block 515 and the last strobe detect block 520. The state machine control block 515 includes a flip-flop 600, a first AND gate 605, a second AND gate 610, a first and second counter 612,614, a first and a second programmable knob register 616,618, a first and a second comparator 620,622, and an inverter 625. The first and second comparator 620,622 can be any logic device (or devices) capable of comparing two input values and generating a logic high signal if the values match, or a logic low signal if they do not match. The first comparator 620 compares the output of the first counter 612 and the first programmable knob register 616, and the second comparator 614 compares the output of the second counter 614 and the second programmable knob register 618. The outputs of the first and second comparators 620, 622 are coupled to the first input terminals of the respective first and second AND gates 605,610. An output of the flip-flop 600 is coupled to a second (inverted) input terminal of the first AND gate 605, a second terminal of the second AND gate 610, and an input terminal of the inverter 625. An output of the first AND gate 605 is coupled to an enable input terminal of the flip-flop 600, and an output of the second AND gate 610 is coupled to a reset input terminal of the flip-flop 600. An output of the inverter 625 is coupled to the first input of the AND gate 530.

The last strobe detect block 520 includes a flip-flop 630, an inverter 635, and a NOR gate 640. An output of the flip-flop 630 is coupled to the inverter 635 through a feedback loop, and is also coupled a first input of the NOR gate 640. An output of the inverter 635 is coupled to a data input terminal of the flip-flop 630. The strobe STB signal is coupled to a clock input terminal of the flip-flop 630, as well as to a second input of the NOR gate 640. An output of the NOR gate 640 is coupled to the second input of the AND gate 530. The output of the AND gate 530 is coupled to the enable input terminal of the CPU driver 6.

The second embodiment of the present invention prevents the strobes from drifting to a metastable state during the turnaround cycle by taking advantage of a known timing relationship between the internal clock (not shown) of the CPU 500 and the internal clock (not shown) of the cache controller 510. That is, by determining the time intervals that the cache controller 510 will drive the strobes, the CPU 500 can ensure that the strobes will be driven for all times other than the time that they are driven by the cache controller 510. The CPU 500 acts as the "default" master because, by default, it drives the strobes for all times except when the cache controller 510 controls the strobes.

Figure 5:
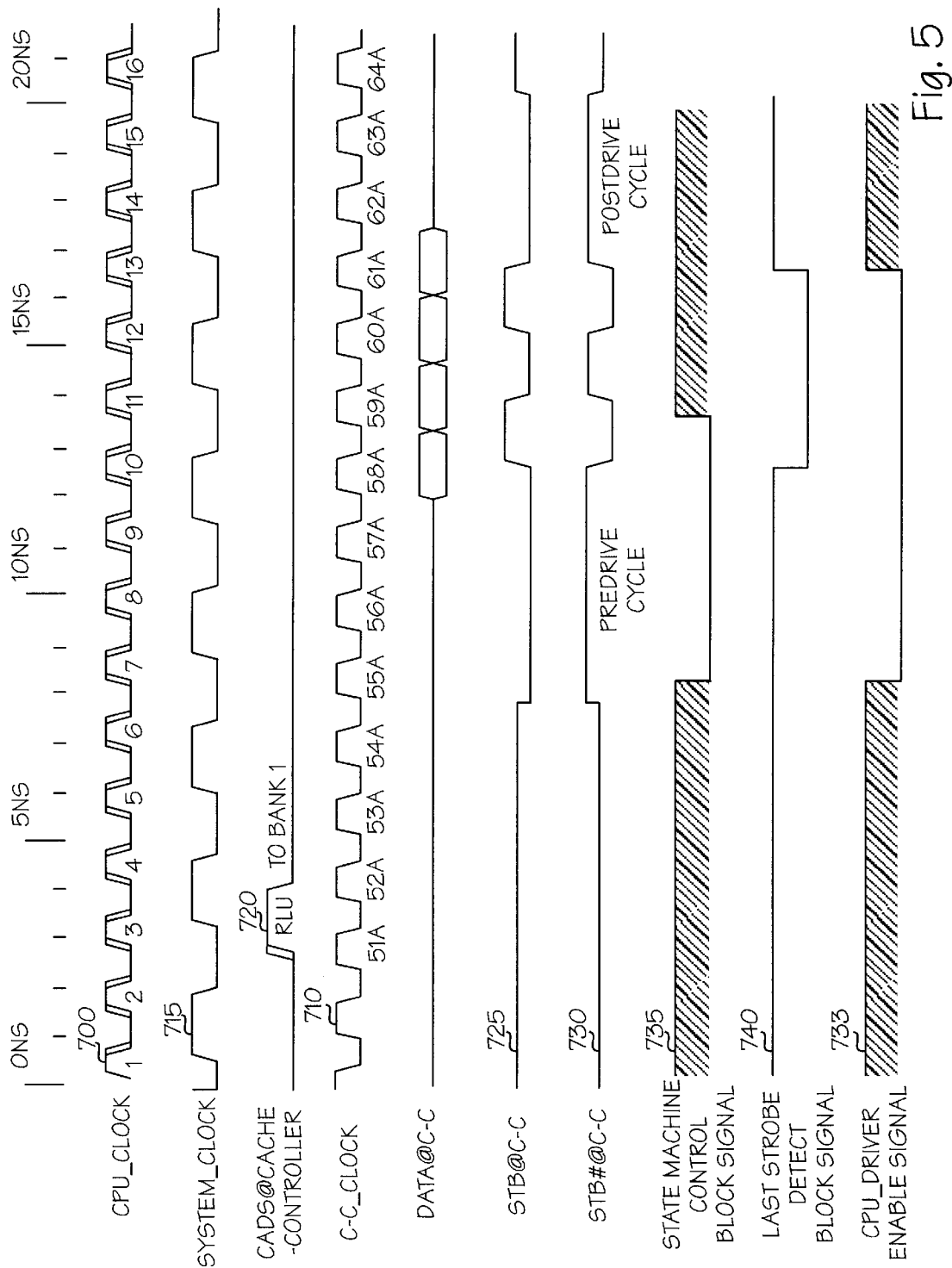
FIG. 5 is a timing diagram of the second embodiment of the present invention.

Generally, chips in a computer system are synchronized with respect to each other. For example, as can be seen in FIG. 5, which illustrates a timing diagram of the second embodiment of the present invention, an internal CPU_clock 700 and cache-controller_clock 710 have a known timing-relationship with respect to each other. This is because the CPU_clock 700 is utilized to generate a system_clock 715, which is further used by a PLL (not shown) to generate the cache-controller_clock 710. Thus, clock cycle 1 of the CPU_clock 700 corresponds to clock cycle 51A of the cache-controller_clock 710, clock cycle 2 of the CPU_clock 700 corresponds to clock cycle 52A of the cache-controller_clock cycle, and so forth. As can be seen in FIG. 5, the cache-controller_clock 710 typically lags the CPU_clock 700 by a certain interval.

Because of the known timing relationship between the CPU_clock 700 and the cache-controller_clock 710, the CPU 500 can determine when the cache controller 510 will transmit data in response to a CPU 500 request. In FIG. 5, the CPU 500 issues a request signal, CADS@cache-controller 720, to the cache controller 510 at clock cycle an 51A of the cache-controller_clock 710 (i.e. or, alternatively, during the first cycle of the CPU_clock 700). The cache controller 510 will take N clock cycles to process and respond to the CPU's 500 request. The timing diagram of FIG. 5, for illustrative purposes, assumes that N is equal to six. This means that the CPU 500 should allow the cache controller 510 to drive the strobes at clock cycle 57A (i.e. six plus 51A, where 51A is the time when the CPU 500 request was initially made). The CPU 500 should then regain control of the strobes when the cache controller 510 completes its transmission which, in this case, is at clock cycle 61A of the cache-controller_clock 710.

The above described method would effectively prevent the strobes from drifting to a metastable state during the turnaround cycle if the cache-controller_clock 710 and the CPU_clock 700 were perfectly aligned and if the CPU's 500 transition from a driver mode to a receiver mode were instantaneous. However, since, as a practical matter, neither condition is likely to occur, it is necessary for the cache controller 510 to pre-drive and post-drive the strobes for a certain duration. As can be seen in FIG. 5, clock cycle 57A of the cache-controller clock 710 lags its corresponding clock cycle 7 of the CPU_clock 700. Thus, if the CPU 500 were to stop driving at clock cycle 7 of the CPU_clock 700, before the cache controller 510 started driving the strobes at clock cycle 57A of the cache-controller_clock 710, the strobes would drift to a metastable state. To prevent the strobes from drifting to a metastable state, the cache controller 510 pre-drives the strobes a few cycles before clock cycle 57A of the cache-controller_clock 710. In FIG. 5, for instance, the STB@cache-controller and the STB#cache-controller signals 725,730 are pre-driven at clock cycle 55A of the cache-controller_clock 710.

It is also possible for the strobes to drift to a metastable state after the cache controller 510 has completed its transmission. The cache controller 510 stops driving the strobes at clock cycle 61A of the cache-controller_clock 710. However, the CPU 500 cannot drive the strobes at clock cycle 11 (i.e. CPU_clock cycle 11 corresponds to cycle 61A of the cache-controller_clock 710) of the CPU_clock 700 because the clock cycle 61A lags the corresponding CPU_clock 700 cycle. Thus, the CPU 500 must wait until the last transition of one of the strobes, STB or STB#, is received before driving again. However, it is possible that while the CPU 500 is receiving the last transition of the strobe signal, that the cache controller 510 has already stopped driving. To ensure that the strobes are retained at a known voltage level after the cache controller 510 has completed its transaction and before the CPU 500 has received the last transition of the STB, the cache controller 510 post-drives the strobes for a selected interval. In FIG. 5, for instance, the cache controller 510 post drives the STB@cache-controller and STB#@cache-controller signals 725,730 for about two clock signals.

The strobe controller 540 (see FIG. 3) of the cache controller 510 generates the driver enable signal that controls the cache controller driver 15. The desired pre-drive and post-drive intervals can be produced by either adding or subtracting clock cycles from the driver enable signal generated by the strobe controller 540 of the cache controller 510. The duration of the pre-drive and post-drive intervals can vary from one application to another, depending on the particular implementation. It is possible to have programmable intervals, where the duration of the pre-drive and post-drive cycles can be stored in programmable knob registers (not shown).

The strobe controller 512 (see FIG. 3) is utilized to generate the CPU_driver enable signal 733 (see FIG. 5) to control the CPU driver 6. The state machine control block signal 735 of FIG. 5 is generated by the state machine control block 515 of the strobe controller 512. As shown, the state machine control block signal 735 is low for clock cycles 7 through 11 of the CPU_clock 700, the interval during which the cache controller 510 drives the strobes. The last strobe detect block signal 740, generated by the last strobe detect block 520 of the strobe controller 512, is low from the first transition of the strobe signal until the last transition, at which time it goes high, thus signifying that the last strobe transition has reached the CPU 500. The CPU_driver enable signal 733, which remains low while either the last strobe detect block signal 740 or the state machine control block signal 735 is low, disables the CPU driver 6 until the last transition of the strobe has been received by the CPU 500.

The state machine control block 515 of the CPU 500 determines the intervals when the cache controller 510 will drive the strobes based on a knob value stored in the first programmable knob register 616 (see FIG. 4), and, thus, control the CPU driver 6 accordingly. The value of the programmable knob register 616 is typically determined at the time the CPU 500 is reset. The value signifies the number of cycles that the state machine control block 515 must wait after submitting a request (i.e. CADS@cache-controller 720) to the cache controller 510 before disabling the CPU driver 6, or, put another way, the time it takes for the cache controller 510 to process and respond to the CPU 500 request. Once the CPU 500 issues a request, the first counter 612 (see FIG. 4) starts counting the CPU_clock 700 cycles that have transpired since the request was issued, and once the first counter 612 reaches the value stored in the programmable knob register 616, the state machine control block 515 generates a logic low state machine control block signal 735 (see FIG. 5).

The state machine control block 515 of the CPU 500 generates a logic high state machine control block signal 735 once the time needed for the cache controller 510 to complete its transaction has expired. The second counter 614 (see FIG. 4) and the second programmable knob register 618 are used in a similar manner as the first counter 612 and the first programmable knob register 616 described above, except in this case they are utilized in activating the state machine control block signal 735.

Figure 6:
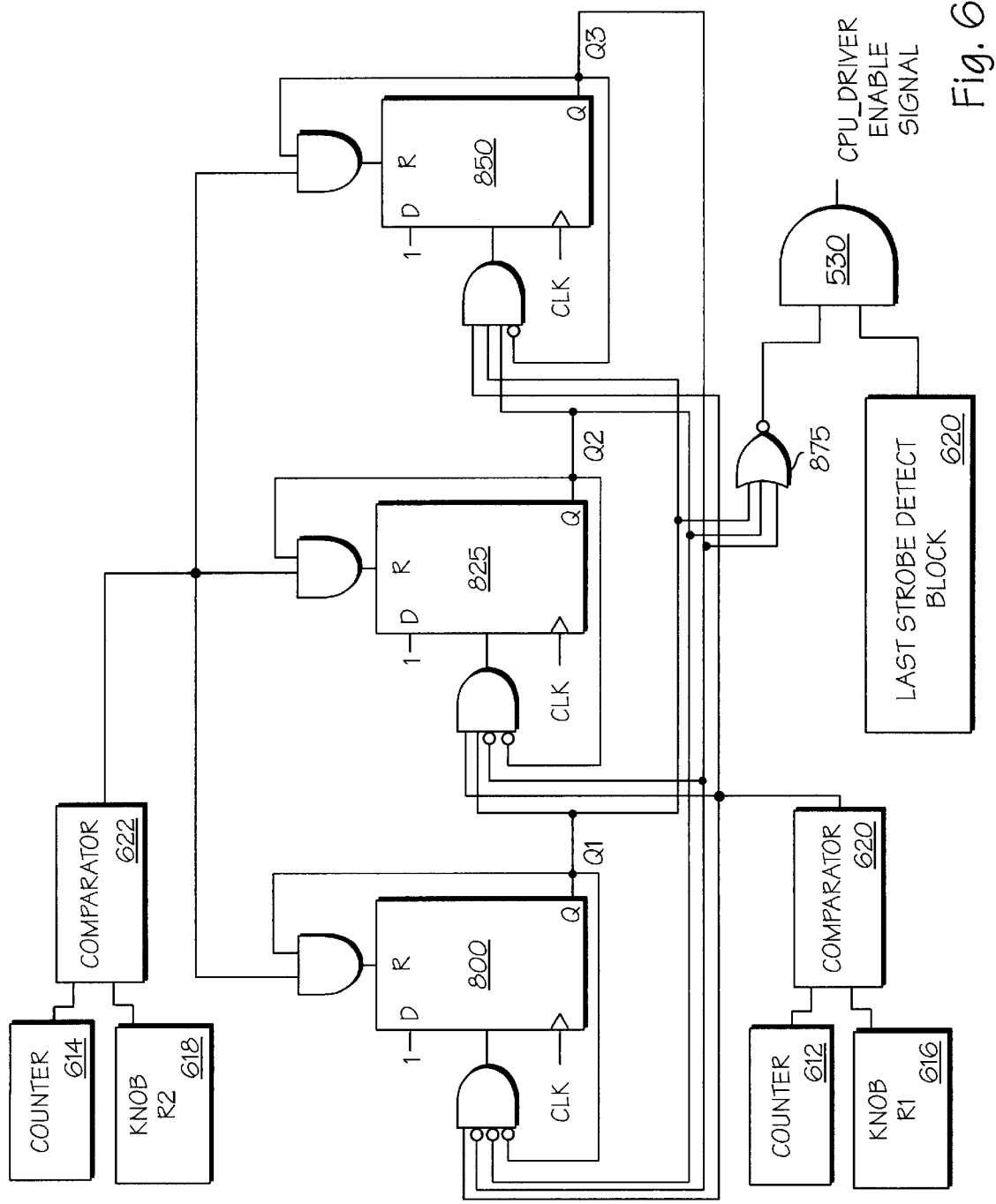
FIG. 6 is a schematic diagram of a state machine control block with three-stage pipeline of the second embodiment of the present invention.

Although FIG. 4 illustrates the state machine control block 515 of the strobe controller 512 having a single flip-flop 600, it is possible to utilize a plurality of flip-flops for submitting a plurality of simultaneous requests to the cache controller 510. That is, it is possible to have a multi-stage pipeline for the strobe controller 512 that would allow the CPU 500 to submit several back to back requests to the cache controller 510. The CPU 500 would then wait for the cache controller 510 to process and respond to the requests. For example, FIG. 6 illustrates a three stage pipeline that allows the CPU 500 to transmit three simultaneous requests to the cache controller 510. As shown, FIG. 6 includes a first, second, and third flip-flop 800,825,850.

The first, second and third flip-flops 800,825,850 work in a similar manner as the flip-flop 600 of FIG. 4. Furthermore, the first and second counters 612,614, the first and second programmable knob registers 616,618, and the first and second comparators 620,622 are identical to those depicted in FIG. 4, as indicated by the use of like numerals. In a three-stage pipeline, three flip-flops 800,825,850 are required to support the three CPU 500 requests. The output of the three flip-flops 800,825,850 are coupled to a NOR 875 gate. The NOR gate 875 serves a similar purpose as the inverter 625 of FIG. 3. The output of the NOR gate 875 is coupled to the first input of the AND gate 530 of the strobe controller 512, whereas the output of the last strobe detect block 620 is coupled to the second input of the AND gate 530 of the strobe controller 512. The output of the strobe controller 512 is the driver enable signal that controls the CPU driver 6.

The first and the second embodiment of the present invention can be implemented in logic design in a variety of configurations. Although the illustrated embodiments include transmissions of signals between the CPU 3,500 (see FIG. 1 and FIG. 3) and the cache controller 12,510 (see FIG. 1 and FIG. 3) the present invention is equally applicable to transmission of signals between a plurality of processors, controllers, or any other logic chips, which may have external ports for transmitting and receiving signals.

In one particular implementation in which the CPU 3,500 is the default strobe driver and is communicating with two cache controllers 12,510, the CPU 3,500 can drive the strobes during: a reset, after a reset until a first data transfer operation, during a data write to a cache (not shown) of the cache controller 12,510, during a data read from the cache of the cache controller 12,510 (until one of the cache controllers 12,510 wants to drive). The CPU 3,500 would release the control of the strobes once the cache controllers 12,510 start driving, and then regain the control once the cache controllers 12,510 have completed a transfer.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A method of maintaining a strobe signal at a valid voltage level, comprising:

driving the strobe signal at the valid voltage level using a first strobe driver;

pre-driving the strobe signal at the valid voltage level using a second strobe driver while the first strobe driver is driving; and terminating the driving of the first strobe driver by, transmitting a termination enable control signal to a second strobe controller, receiving the termination enable control signal using the second strobe controller, and using the second strobe controller to terminate the driving of the first strobe driver.

2. The method of claim 1, wherein the act of pre-driving includes transmitting a termination enable signal to the first strobe driver while activating an enable input of the second strobe driver.

3. The method of claim 1, wherein the act of pre-driving comprises:

determining a start time the second strobe driver drives the strobe signal; and driving the strobe signal a selected interval before the start time of the second strobe driver.

4. The method of claim 1, further comprising post-driving the strobe signal at the valid voltage level for a selected interval using the second strobe driver.

5. A method of maintaining a strobe signal at a valid voltage level, comprising:

driving the strobe signal at the valid voltage level using a first strobe driver;

pre-driving the strobe signal at the valid voltage level using a second strobe driver while the first strobe driver is driving; and terminating the driving of the first strobe driver; and post-driving the strobe signal at the valid voltage level for a selected interval using the second strobe driver, wherein the act of post-driving includes transmitting a termination enable signal to the first strobe driver and then maintaining the strobe signal at the valid voltage level at least until the termination enable signal activates an enable input of the first strobe driver.

6. The method of claim 5, wherein the act of pre-driving includes transmitting a termination enable signal to the first strobe driver while activating an enable input of the second strobe driver.

7. The method of claim 5, wherein the act of pre-driving comprises:

determining a start time the second strobe driver drives the strobe signal; and driving the strobe signal a selected interval before the start time of the second strobe driver.

8. The method of claim 5, wherein the act of terminating comprises:

transmitting a termination enable control signal to a second strobe controller;

receiving the termination enable control signal using the second strobe controller; and using the second strobe controller to terminate the driving of the first strobe driver.

9. The method of claim 5, wherein the act of terminating comprises:

determining a start time at which the second strobe driver drives the strobe signal;

terminating the driving of the first strobe driver at about the start time of the second strobe driver.

10. A method of maintaining a strobe signal at a valid voltage level, comprising:

driving the strobe signal at the valid voltage level using a first strobe driver;

pre-driving the strobe signal at the valid voltage level using a second strobe driver while the first strobe driver is driving; and terminating the driving of the first strobe driver; and post-driving the strobe signal at the valid voltage level for a selected interval using the second strobe driver,
wherein the act of post-driving comprises determining a start time at which the first strobe driver drives the strobe signal, determining a stop time at which the second strobe driver stops driving the strobe signal, and post-driving the strobe signal using the second strobe driver for a preselected interval after the stop time of the second strobe driver and at least until the start time of the first strobe driver.

11. The method of claim 10, wherein the act of pre-driving includes transmitting a termination enable signal to the first strobe driver while activating an enable input of the second strobe driver.

12. The method of claim 10, wherein the act of pre-driving comprises:

determining a start time the second strobe driver drives the strobe signal; and driving the strobe signal a selected interval before the start time of the second strobe driver.

13. The method of claim 10, wherein the act of terminating comprises:

transmitting a termination enable control signal to a second strobe controller;

receiving the termination enable control signal using the second strobe controller; and using the second strobe controller to terminate the driving of the first strobe driver.

14. The method of claim 10, wherein the act of terminating comprises:

determining a start time at which the second strobe driver drives the strobe signal;

terminating the driving of the first strobe driver at about the start time of the second strobe driver.

15. A method of maintaining a strobe signal at a valid voltage level, comprising:

driving the strobe signal at the valid voltage level using a first strobe driver;

pre-driving the strobe signal at the valid voltage level using a second strobe driver while the first strobe driver is driving; and terminating the driving of the first strobe driver; and post-driving the strobe signal at the valid voltage level for a selected interval using the second strobe driver; and terminating the driving of the second strobe driver upon detection of the last transition of the strobe signal received by a first strobe receiver.

16. The method of claim 15, wherein the act of pre-driving includes transmitting a termination enable signal to the first strobe driver while activating an enable input of the second strobe driver.

17. The method of claim 15, wherein the act of pre-driving comprises:

determining a start time the second strobe driver drives the strobe signal; and driving the strobe signal a selected interval before the start time of the second strobe driver.

18. The method of claim 15, wherein the act of terminating comprises:

transmitting a termination enable control signal to a second strobe controller;

receiving the termination enable control signal using the second strobe controller; and using the second strobe controller to terminate the driving of the first strobe driver.

19. The method of claim 15, wherein the act of terminating comprises:

determining a start time at which the second strobe driver drives the strobe signal;

terminating the driving of the first strobe driver at about the start time of the second strobe driver.

20. A strobe circuit, comprising:

a strobe line;

a first strobe driver having a first enable input for enabling the first strobe driver and adapted to drive the strobe line with a first strobe signal, wherein the first strobe controller comprises a first state machine control block having an input and an output, the first state machine control block adapted to provide a termination enable signal to disable the first strobe driver and enable the second strobe driver; and an edge-based delay block having an input coupled to the first state machine control block and adapted to delay a termination enable signal to the second strobe driver to allow the second strobe driver to post-drive the second strobe signal at least until the first strobe driver starts driving;

a second strobe driver having a second enable input for enabling the second strobe driver and adapted to drive the strobe line with a second strobe signal; and a first strobe controller coupled to the second enable input and adapted to enable the second strobe driver to pre-drive the second strobe signal while the first strobe driver is enabled, wherein the first and second strobe signals are at equal logic levels.

21. The strobe circuit of claim 20, further comprising:

a first strobe receiver having an input and an output, the first strobe receiver adapted to receive the second strobe signal; and a first CTT interface coupled to the input of the first strobe receiver.

22. The strobe circuit of claim 21, further comprising:

a second strobe receiver having an input and an output, the second strobe receiver adapted to receive the first strobe signal; and a second CTT interface coupled to the input of the second strobe receiver.

23. A strobe circuit, comprising:

a strobe line;

a first strobe driver having a first enable input for enabling the first strobe driver and adapted to drive the strobe line with a first strobe signal;

a second strobe driver having a second enable input for enabling the second strobe driver and adapted to drive the strobe line with a second strobe signal;

a first strobe controller coupled to the second enable input and adapted to enable the second strobe driver to pre-drive the second strobe signal while the first strobe driver is enabled, wherein the first and second strobe signals are at equal logic levels; and a second strobe controller comprising a receiver block adapted to receiving a termination enable signal from the first strobe controller to control the enable input of the first strobe driver.

24. The strobe circuit of claim 23, further comprising:

a first strobe receiver having an input and an output, the first strobe receiver adapted to receive the second strobe signal; and a first CTT interface coupled to the input of the first strobe receiver.

25. The strobe circuit of claim 24, further comprising:
a second strobe receiver having an input and an output, the second strobe receiver adapted to receive the first strobe signal; and
a second CTT interface coupled to the input of the second strobe receiver.

26. A strobe circuit, comprising:
a strobe line;
a first strobe driver having a first enable input for enabling the first strobe driver and adapted to drive the strobe line with a first strobe signal;
a second strobe driver having a second enable input for enabling the second strobe driver and adapted to drive the strobe line with a second strobe signal;
a first strobe controller coupled to the second enable input and adapted to enable the second strobe driver to pre-drive the second strobe signal while the first strobe driver is enabled, wherein the first and second strobe signals are at equal logic levels; and
a second strobe controller comprising a second state machine control block having an output and adapted to determine intervals the first strobe driver stops driving, and a last strobe detect block having an input and an output, the input coupled to the first strobe receiver, the last strobe detect block adapted to detect the last transition of the second strobe signal.

27. The strobe circuit of claim 26, further comprising an AND gate having a first input coupled to the output of the second state machine control block, a second input coupled to the output of the last strobe detect block, and an output coupled to the enable input of the first strobe driver.

28. The strobe circuit of claim 26, wherein the last strobe detect block comprises:
a flip-flop having a data input, a reset input, a clock input coupled to the first strobe receiver, and an output;
an inverter having an input coupled to the output of the flip-flop and an output coupled to the data input of the flip-flop; and
a NOR gate having a first input coupled to the first strobe receiver and a second input coupled to the output of the flip-flop.

29. The strobe circuit of claim 26, wherein the second state machine control block comprises:
an inverter having an input and an output;
a flip-flop having a data input coupled to a logic high signal, a reset input, a clock input, an enable input, and an output coupled to the input of the inverter;
a first AND gate having a first input, second input coupled to the output of the flip-flop, and an inverted output coupled to the output of the flip-flop;
a second AND gate having a first input, a second input coupled to the output of the flip-flop, and an output coupled to the reset input of the flip-flop;
a first comparator having a first input, a second input, and an output, the output of the first comparator coupled to the first input of the first AND gate;
a second comparator having a first input, a second input, and an output, the output of the second comparator coupled to the first input of the second AND gate;
a first counter having an output coupled to the first input of the first comparator;
a second counter having an output coupled to the first input of the second comparator;
a first knob register having an output coupled to the second input of the first comparator; and
a second knob register having an output coupled to the second input of the second comparator.

30. The strobe circuit of claim 26, wherein the second state machine control block includes means for determining intervals the first driver is disabled after issuing a plurality of requests to the second strobe driver.

31. A strobe circuit, comprising:
an external port;
a first strobe driver having an enable input and being adapted to provide a first strobe signal to the external port;
a first strobe receiver adapted to receive an external strobe signal from the external port; and
a strobe controller adapted to control the enable input of the first strobe driver after detecting a last transition in the external strobe signal,
wherein the strobe controller comprises,
a state machine control block having an output, the state machine control block adapted to determine an interval the first strobe driver is disabled, and
a last strobe detect block having an input and an output, the input coupled to the first strobe receiver, the last strobe detect block adapted to detect a last transition of the external strobe signal.

32. The strobe circuit of claim 31, further comprising an AND gate having a first input coupled to the output of the state machine control block, a second input coupled to the output of the last strobe detect block, and an output coupled to the enable input of the first strobe driver.

33. The strobe circuit of claim 32, wherein the state machine control block is adapted to determine an interval the first strobe driver is disabled after submitting a plurality of back to back requests to the second strobe driver.

34. The strobe circuit of claim 32, wherein the last strobe detect block comprises:
a flip-flop having a data input, a reset input, a clock input coupled to the first strobe receiver, and an output;
an inverter having an input coupled to the output of the flip-flop and an output coupled to the data input of the flip-flop; and
a NOR gate having a first input coupled to the first strobe receiver and a second input coupled to the output of the flip-flop.

35. The strobe circuit of claim 32, wherein the state machine control block comprises:
an inverter having an input and an output;
a flip-flop having a data input coupled to a logic high signal, a reset input, a clock input, an enable input, and an output coupled to the input of the inverter;
a first AND gate having a first input, second input coupled to the output of the flip-flop, and an inverted output coupled to the output of the flip-flop;
a second AND gate having a first input, a second input coupled to the output of the flip-flop, and an output coupled to the reset input of the flip-flop;
a first comparator having a first input, a second input, and an output, the output of the first comparator coupled to the first input of the fist AND gate;
a second comparator having a first input, a second input, and an output, the output of the second comparator coupled to the first input of the second AND gate;
a first counter having an output coupled to the first input of the first comparator;

a second counter having an output coupled to the first input of the second comparator;

a first knob register having an output coupled to the second input of the first comparator; and a second knob register having an output coupled to the second input of the second comparator.

36. The strobe circuit of claim 31, further comprising a CTT interface coupled to the input of the first strobe receiver.

37. A strobe circuit, comprising:

an external port;

a first strobe driver adapted to provide a first strobe signal to the external port, the first strobe driver including an enable input, the enable input being adapted to receive an external termination enable signal and disable the first strobe driver in response to the external termination enable signal;

a first strobe controller adapted to pre-drive the first strobe driver the first strobe controller including, a first state machine control block having an input and an output, the state machine control block adapted to provide a termination enable signal to enable the first strobe driver, and an edge-based delay block having an input coupled to the first state machine control block and adapted to delay a termination enable signal to the first strobe driver to allow the first strobe driver to post-drive the first strobe signal for a preselected interval;

a first strobe receiver having an input; and a CTT interface coupled to the input of the first strobe receiver.

* * * * *

UNITED STATES PATENT AND TRADEMARK OFFICE
CERTIFICATE OF CORRECTION

PATENT NO. : 6,092,212
DATED : July 18, 2000
INVENTOR(S) : Muljono et al.

It is certified that error appears in the above-identified patent and that said Letters Patent is hereby corrected as shown below:

Column 7,
Line 18, after "clock cycle", delete "an".

Signed and Sealed this

Eleventh Day of February, 2003

JAMES E. ROGAN
*Director of the United States Patent and Trademark Office*